US006962325B2

(12) United States Patent
Torii et al.

(10) Patent No.: US 6,962,325 B2
(45) Date of Patent: Nov. 8, 2005

(54) ELECTRONICALLY CONTROLLED THROTTLE APPARATUS

(75) Inventors: Katsuya Torii, Anjo (JP); Shinsuke Miyazaki, Obu (JP); Masato Arai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/045,058

(22) Filed: Jan. 31, 2005

(65) Prior Publication Data

US 2005/0126536 A1 Jun. 16, 2005

Related U.S. Application Data

(62) Division of application No. 10/685,577, filed on Oct. 16, 2003, now Pat. No. 6,863,259.

(30) Foreign Application Priority Data

Oct. 30, 2002 (JP) ............................ 2002-315249

(51) Int. Cl.⁷ ................................................ F16K 1/22
(52) U.S. Cl. ....................... 251/305; 251/337; 251/355
(58) Field of Search ............................... 251/305, 337, 251/355

(56) References Cited

U.S. PATENT DOCUMENTS 2,152,651 A * 4/1939 Kinzie et al. ............... 251/355
3,704,635 A 12/1972 Eshelman
4,318,422 A * 3/1982 Nakanishi et al. .......... 251/355
4,625,943 A 12/1986 Groger
4,873,957 A 10/1989 Ueyama et al.
4,880,207 A 11/1989 Matsumoto et al.
5,492,097 A 2/1996 Byram et al.
5,509,396 A 4/1996 Tamaki
5,685,521 A 11/1997 Yoshida et al.
5,762,044 A 6/1998 Hollister et al.
6,173,939 B1 1/2001 Dottavio et al.
6,364,287 B1 * 4/2002 Rauch et al. ............... 251/305
6,622,984 B2 * 9/2003 Rauch et al. ............... 251/305
2002/0078923 A1 6/2002 Torii

FOREIGN PATENT DOCUMENTS

JP 3-50350 3/1991

* cited by examiner

*Primary Examiner*—John Bastianelli
(74) *Attorney, Agent, or Firm*—Nixon & Vanderhye P.C.

(57) ABSTRACT

In an electronically controlled throttle apparatus, a coil spring is shaped to extend from a U-shaped hook portion which is a joint between a first spring portion having a returning function and a second spring portion having an opening function to the other end of the second spring portion. A coating of a lubricant is provided on a sliding contact area between the inside circumferential surface of the coil spring and the outside circumferential surface of the second spring inside circumferential guide. Thus, the sliding resistance in relative motion between the coil spring and the second spring inside circumferential guide can be significantly reduced.

6 Claims, 8 Drawing Sheets

ELECTRONICALLY CONTROLLED THROTTLE APPARATUS

This is a division of our earlier application Ser. No. 10/685,577 filed Oct. 16, 2003 now U.S. Pat. No. 6,863,259.

CROSS-REFERENCE TO RELATED APPLICATION

This application is based on and incorporates herein by reference Japanese Patent Application No. 2002-315249 filed on Oct. 30, 2002.

FIELD OF THE INVENTION

The present invention relates to an electronically controlled throttle apparatus wherein the valve opening of a throttle valve is adjusted by the operation of an actuator, such as a motor, and the quantity of intake air flowing to an internal combustion engine through an intake air passage in a throttle housing is thereby controlled. The present invention more specifically relates to an electronically controlled throttle apparatus comprising one coil spring the intermediate portion of which is bent in U-shape to form a U-shaped hook portion secured in an intermediate position and both ends of which are wound in different directions.

BACKGROUND OF THE INVENTION

Conventionally, as disclosed in U.S. Pat. No. 5,492,097, an electronically controlled throttle apparatus is provided with an opener-side mechanism (rimp-home mechanism) which opens the throttle valve. With such a mechanism, if current supply to a driving motor is interrupted for some reason, a throttle valve is mechanically brought into a predetermined position (intermediate stop position). A plurality of springs of different biasing forces may be used in such a mechanism. This predetermined position is an intermediate position between a fully closed position and a fully open position of the throttle valve. Thus, the internal combustion engine is prevented from being immediately stopped and the vehicle can be driven to a turnout (e.g., repair shop).

Such a mechanism requires two lever members (opener member and intermediate stop member) and two spring members (spring for opening function and spring for returning function). This poses increases in the number of parts and cost. Further, the intermediate stop member to be abutted against a locking portion on the throttle housing side adopts complicated construction. That is, the stopper member is so constructed that the intermediate stop position in the throttle valve will be set through a part of abutting against the opener member. This leads to a problem that the opening angle of the throttle valve in the intermediate stop position is varied by variation in component parts or the like as well.

It is proposed to reduce the number of parts in the opener mechanism of an electronically controlled throttle apparatus for the simplification of the construction thereof. Further, it is proposed to enhance the accuracy of the opening angle of a throttle valve in the intermediate stop position. These proposals adopt a coil spring structure are the subject of U.S. 2002/0078923 A1 (EP 1 219 803 A2, JP-P2002-256894A). In this structure, a joint between a first spring portion having a returning function and a second spring portion having a opening function is bent substantially in the reverse U-shape. Thus, a U-shaped hook portion which is fixed in an intermediate stop position defined in a throttle housing is formed. The ends of the coil spring (one end of the first spring portion and the other end of the second spring portion) are wound in different directions.

However, when the throttle valve is closed from the intermediate stop position to the fully closed position, a problem arises. The U-shaped hook portion of the coil spring is secured on one end of a housing hook, and the opener member is rotated together with a spring gear-side hook which constitutes one end of the second spring portion. Thereby, biasing force is produced in such a direction that the throttle valve is returned from the fully closed position to the intermediate stop position. At this time, a spring inside circumferential guide which retains the inside diameter portion of the coil spring is greatly moved relative to the inside circumferential surface of the second spring portion of the coil spring.

Simultaneously, relative motion is produced between an engaging portion which is integrally formed on the valve gear and engages with the U-shaped hook portion and the U-shaped hook portion of the coil spring. Relative motion is also produced between lateral displacement prevention guides for arresting the displacement of the U-shaped hook portion in the axial direction (lateral direction) and the U-shaped hook portion. This increases sliding resistance. Therefore, when the throttle valve is closed from the intermediate stop position to the fully closed position, relative motion is produced between the outside circumferential surface of the spring inside circumferential guide and the inside circumferential surface of the second spring portion of the coil spring. Further, relative motion is also produced between the engaging portion and the lateral displacement prevention guides and the U-shaped hook portion of the coil spring. As a result, great sliding resistance is produced, which causes throttle valve inoperativeness.

SUMMARY OF THE INVENTION

It is therefore an object of the present invention to provide an electronically controlled throttle apparatus wherein sliding resistance which is produced between the outside circumferential surface of a guide member integrally formed on a valve gear and the inside circumferential surface of a coil spring when a throttle valve is closed from an intermediate position to a fully closed position is significantly reduced and thus throttle valve inoperativeness can be prevented.

According to the present invention, an electronically controlled throttle apparatus comprises a throttle valve in a throttle housing, a valve gear which is integrally provided with an opener member which is rotatably driven by an actuator, and a coil spring having a first coil spring portion and a second coil spring portion integrated with each other. The first coil spring portion is for biasing the throttle valve through the opener member in such a direction that the throttle valve is returned from a fully open position to an intermediate position, and the second coil spring portion is wound in an opposite direction relative to the first spring portion and for biasing the throttle valve through the opener member in such a direction that the throttle valve is returned from a fully closed position to the intermediate position. The valve gear is integrally provided with a guide member which holds an inside diameter side of a portion of the coil spring extending at least from a joint between the first spring portion and the second spring portion to an end of the second spring portion.

The guide member includes a first guide member which is protruded in an axial direction from the surface portion of the valve gear, and a second guide member which partly covers an outside circumferential portion of the first guide member. The second guide member is so constructed to reduce a sliding resistance in relative motion between the inside circumferential surface of the coil spring and the outside circumferential surface of the second guide member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
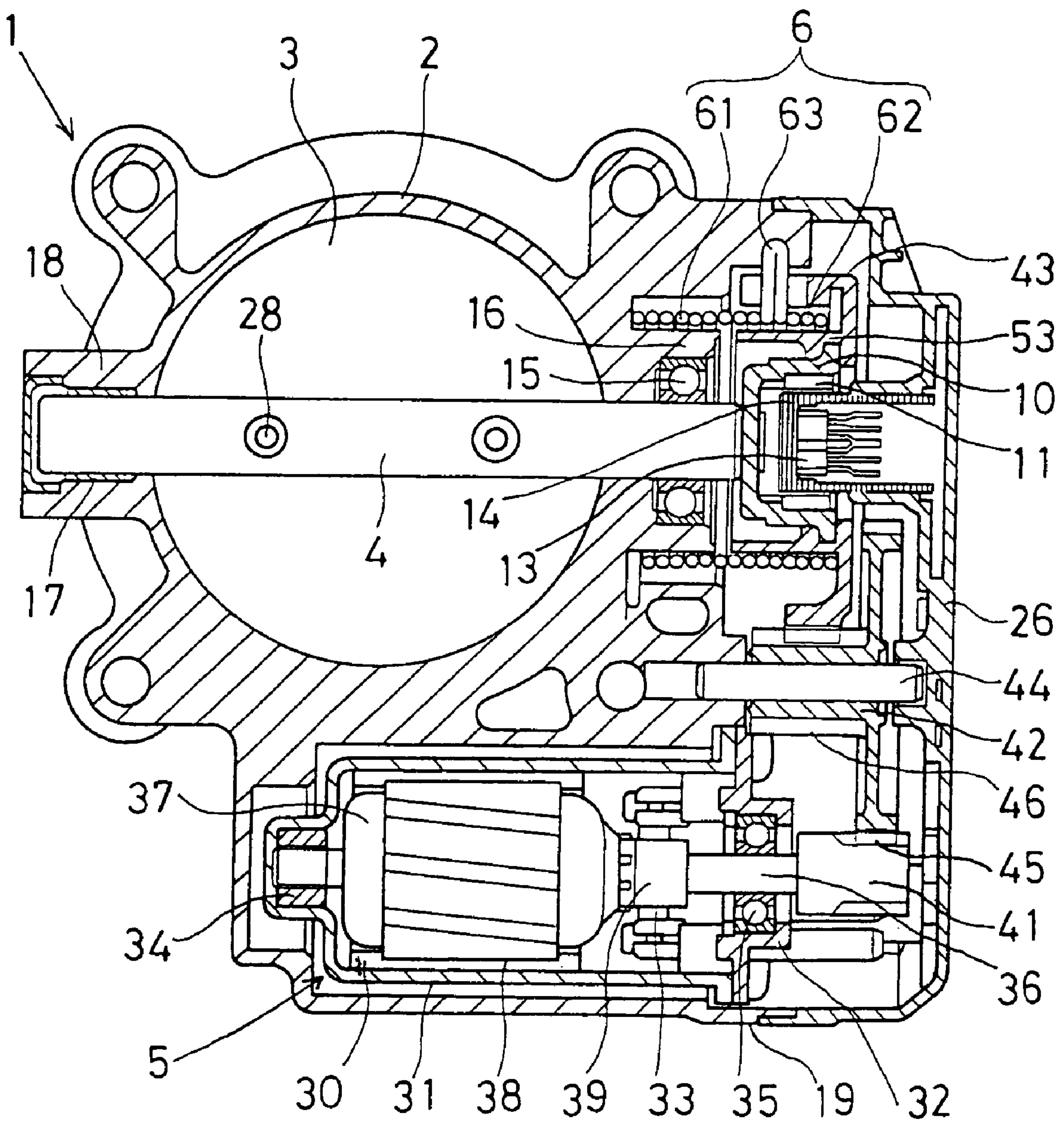
FIG. 1 is a sectional view illustrating an electronically controlled throttle apparatus according to a first embodiment of the present invention.

The present invention will be described in further detail with reference to various embodiments.

[First Embodiment]

An electronically controlled throttle apparatus in this embodiment is an intake air control device for an internal combustion engine, and comprises a throttle housing 1 which forms an intake air passage to an internal combustion engine; a throttle valve 3 rotatably supported in the bore wall portion 2 in the throttle housing 1; a throttle valve shaft 4 which is rotated integrally with the throttle valve 3; and a driving motor 5 as an actuator which drives the throttle valve 3 to open and close the throttle bore through a mechanical reduction gear. The driving motor 5 is electronically controlled by an engine control unit (ECU).

The electronically controlled throttle apparatus controls the quantity of intake air flowing into the engine based on the degree of depression of the accelerator pedal (not shown) of an automobile. The apparatus thereby controls the rotational speed of the engine. The ECU is connected with an accelerator position sensor (not shown). The accelerator position sensor converts the degree of depression of the accelerator pedal into electrical signals (accelerator position signals) and outputs its conversion result to the ECU.

Further, the electronically controlled throttle apparatus is provided with a throttle position sensor. The throttle position sensor converts the opening of the throttle valve 3 into electrical signals (throttle opening signals) and outputs its conversion result to the ECU.

The throttle position sensor comprises a rotor 10 fixed on the right end of the shaft 4, as viewed in relevant figures, by such a fixing means as crimping; split (substantially rectangular) permanent magnets 11 as a source of magnetic fields; split (substantially arc-shaped) yokes (magnetic substance) 12 magnetized by the permanent magnets 11; a Hall element 13 integrally placed on a sensor cover 26 so that the element is opposed to the split permanent magnets 11; terminals (not shown) made of conductive sheet metal for electrically connecting the Hall element 13 with the external ECU; and a stator 14 made of ferrous metal material (magnetic material) for concentrating magnetic flux on the Hall element 13.

The split permanent magnets 11 and the split yokes 12 are secured on the inside circumferential surface of the rotor 10 which is formed by insert molding on a valve gear 43 as a component of the mechanical reduction gear with adhesive or the like. The split permanent magnets 11 are disposed between the two adjoining yokes 12. The split permanent magnets 11 in this embodiment are substantially rectangular permanent magnets whose direction of magnetization is vertical as viewed in FIG. 2. The north pole is positioned on the upper side as viewed in the figure, and the south pole is positioned on the lower side. The permanent magnets 11 are disposed so that the same poles come to the same side.

The Hall element 13 is a non-contact detecting element and is disposed opposite to the inside circumference side of the permanent magnets 11. The Hall element 13 is installed so that when a magnetic field of the north pole or south pole is produced on the sensing face thereof, electromotive force will be produced in response to the magnetic field. When a magnetic field of the north pole is produced, a positive potential is produced. When a magnetic field of the south pole is produced, a negative potential is produced.

The throttle housing 1 is manufactured of a metal material, for example, aluminum die-casting. The throttle body holds the throttle valve 3 in the intake air passage formed in the bore wall portion 2. The throttle housing 1 holds the throttle valve 3 so that the throttle valve 3 can be freely rotated throughout from the fully closed position to the fully open position in the direction of rotation. The throttle housing 1 is fastened and secured on the intake manifold of the engine with fasteners (not shown) such as bolts.

The throttle housing 1 comprises the cylindrical bore wall portion 2 which houses the throttle valve 3 so that the throttle valve 3 can be freely opened and closed; a cylindrical shaft bearing portion (first spring inside circumferential guide) 16 which rotatably supports the right end (one end), as viewed in the figure, of the shaft 4 through a ball bearing 15; a cylindrical shaft bearing portion 18 which rotatably supports the left end (the other end), as viewed in the figure, of the shaft 4 through a dry bearing 17; and a concave gear case 19 which holds the driving motor 5 as an actuator and the mechanical reduction gear.

Figure 3B:
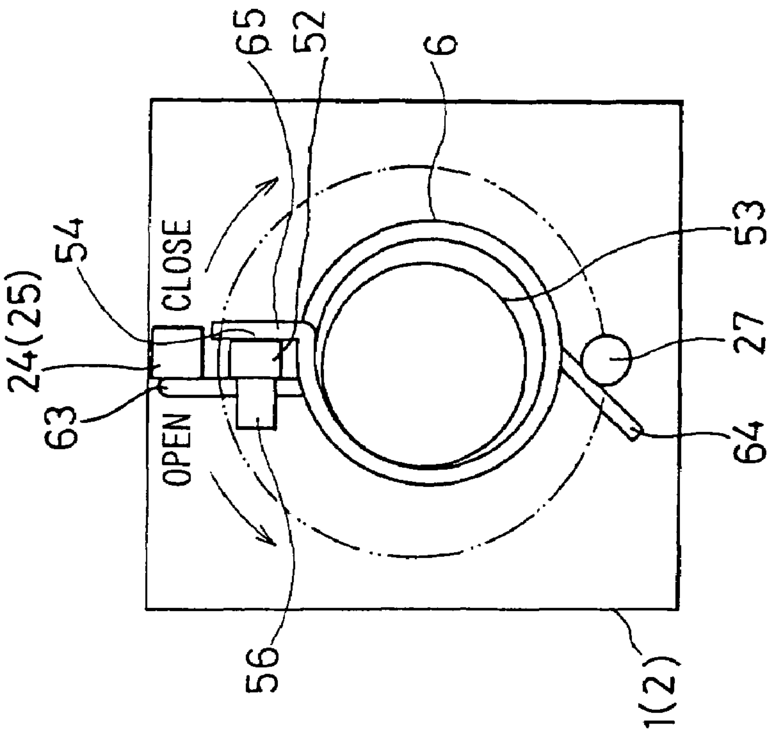
FIGS. 3A and 3B are schematic views illustrating a major part of the electronically controlled throttle apparatus according to the first embodiment.
Figure 3A:
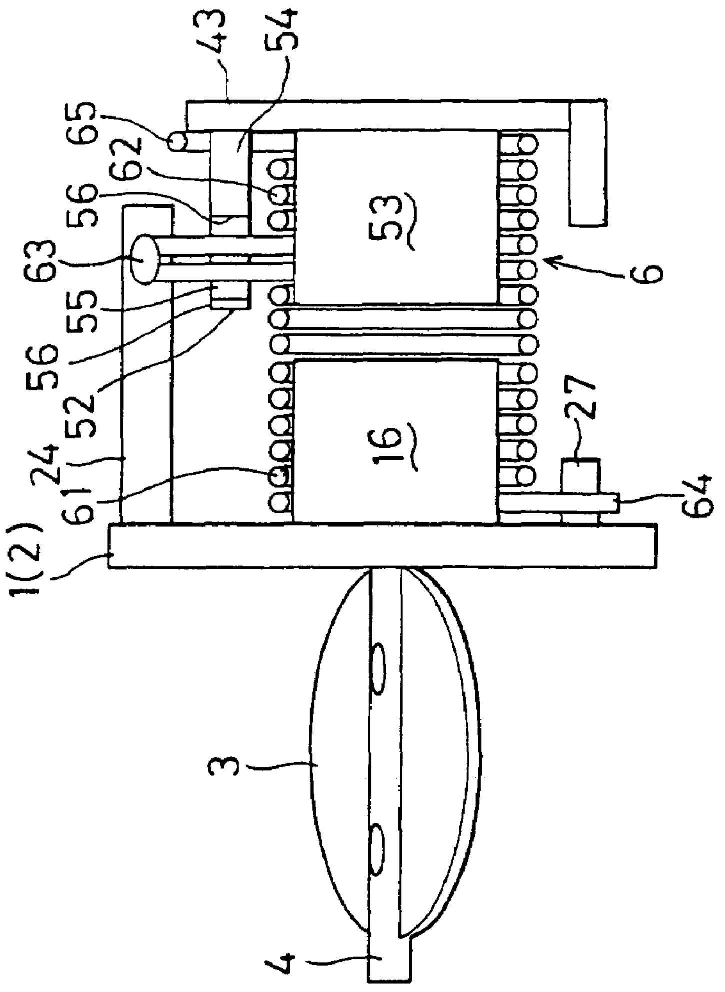
Figure 4A:
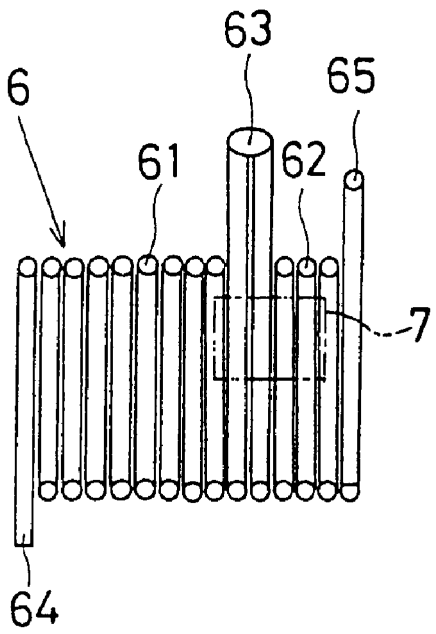
FIG. 4A is a side view illustrating the coil spring.
Figure 4B:
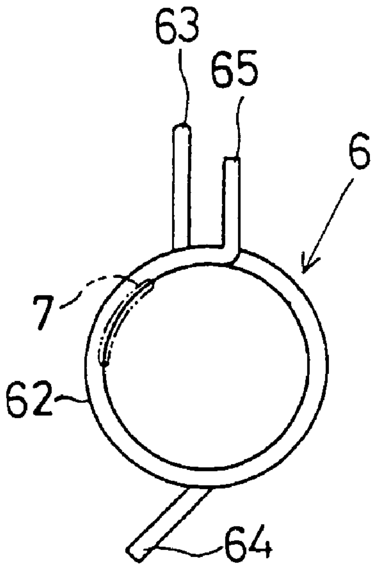
FIG. 4B is a front view illustrating the coil spring.
Figure 4C:
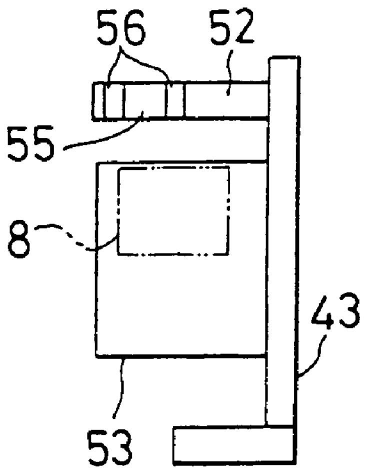
FIG. 4C is a side view illustrating the valve gear with the opener member and the spring inside circumferential guide integrated therewith.
Figure 4D:
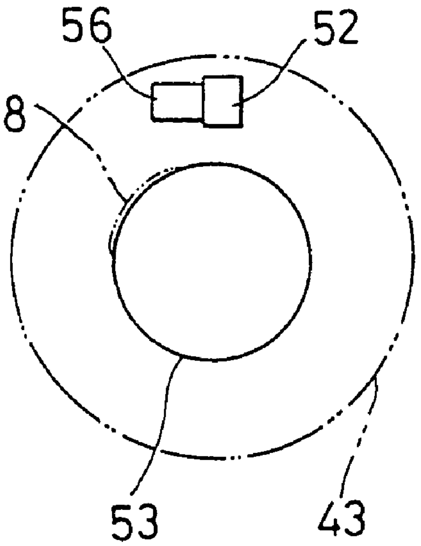
FIG. 4D is a front view illustrating the opener member and the spring inside circumferential guide in the first embodiment.
Figure 5:
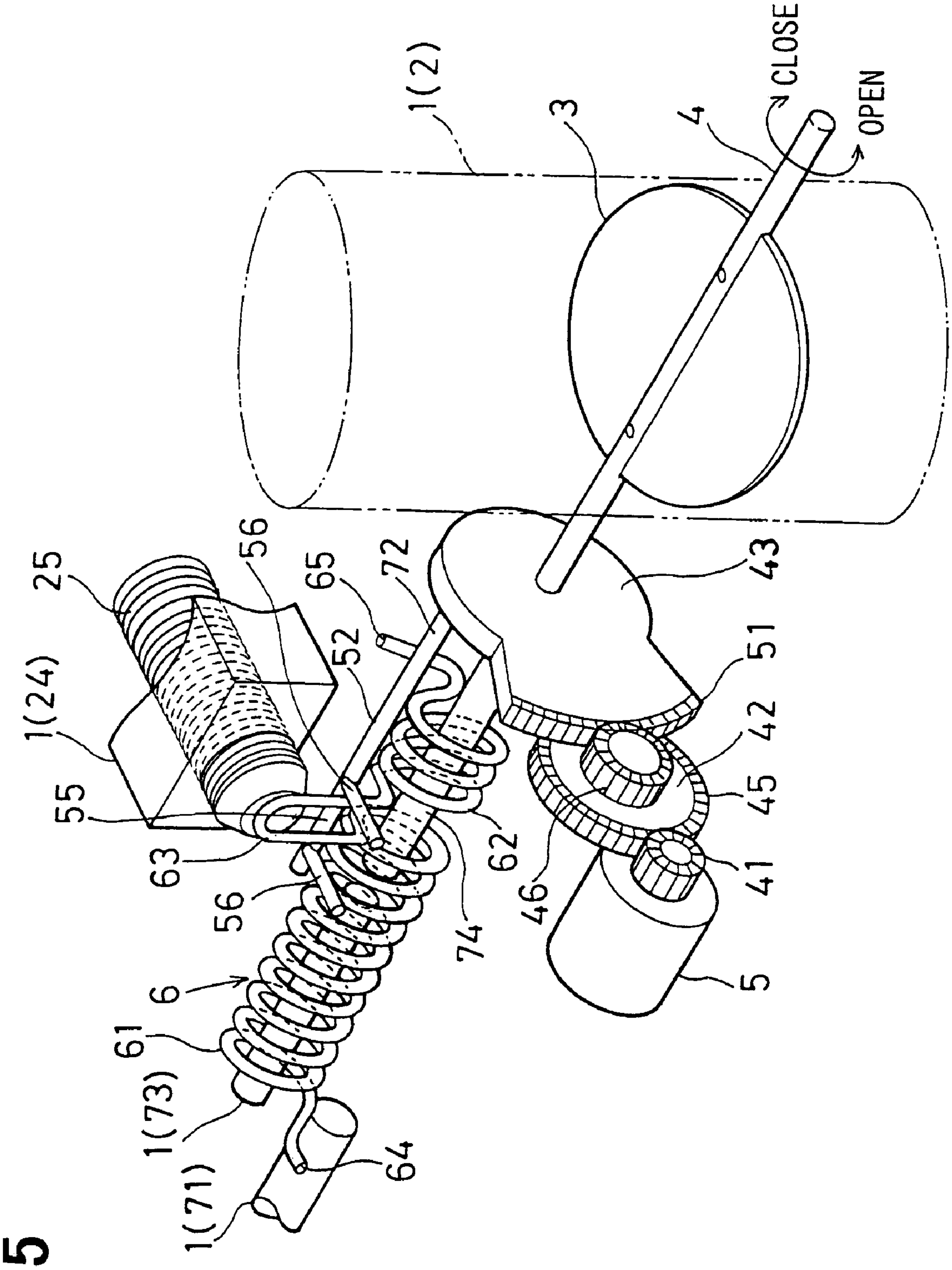
FIG. 5 is a perspective view illustrating a major part of an electronically controlled throttle apparatus according to a second embodiment of the present invention.
Figure 6:
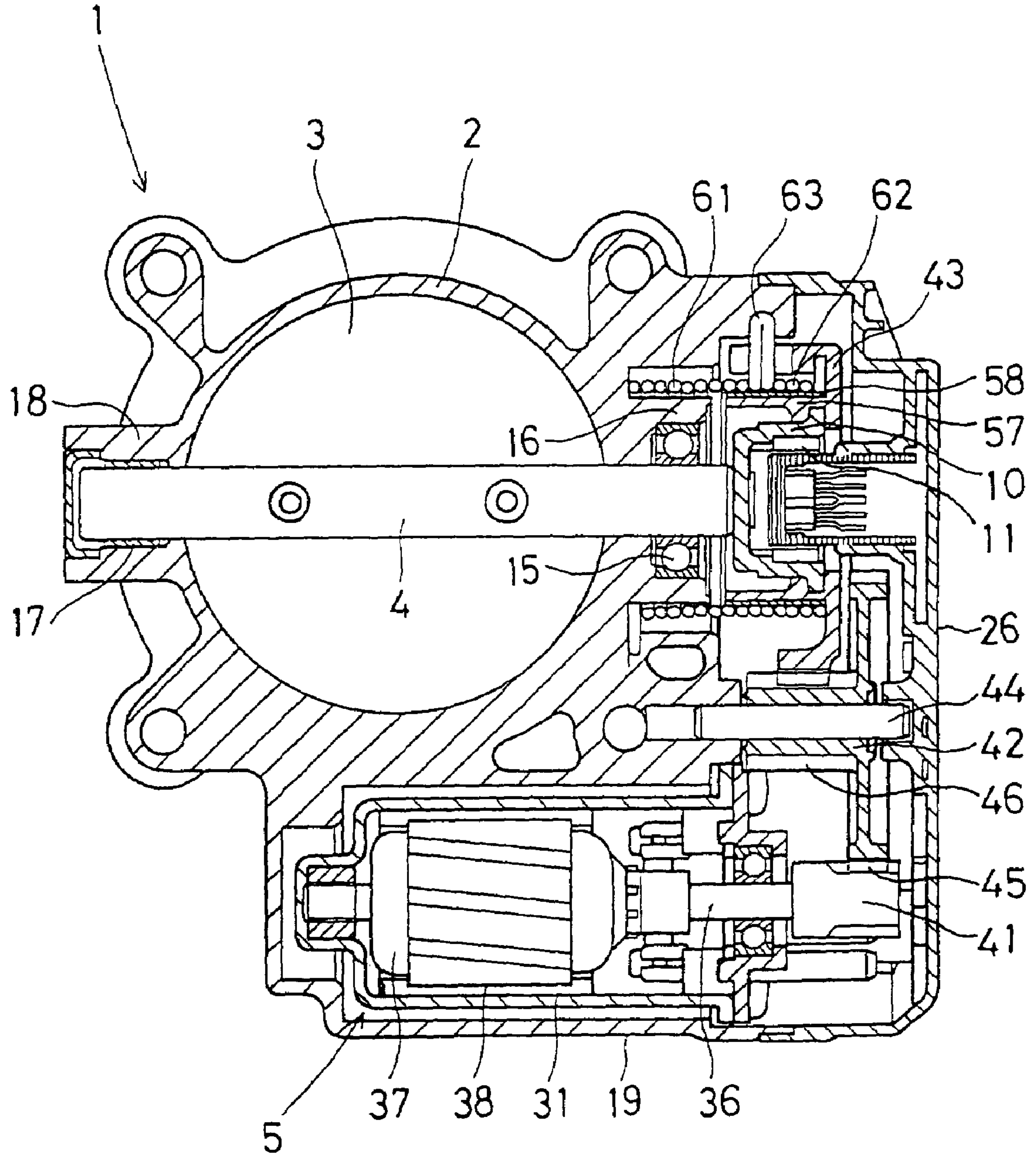
FIG. 6 is a sectional view illustrating an electronically controlled throttle apparatus according to a third embodiment of the present invention.
Figure 7A:
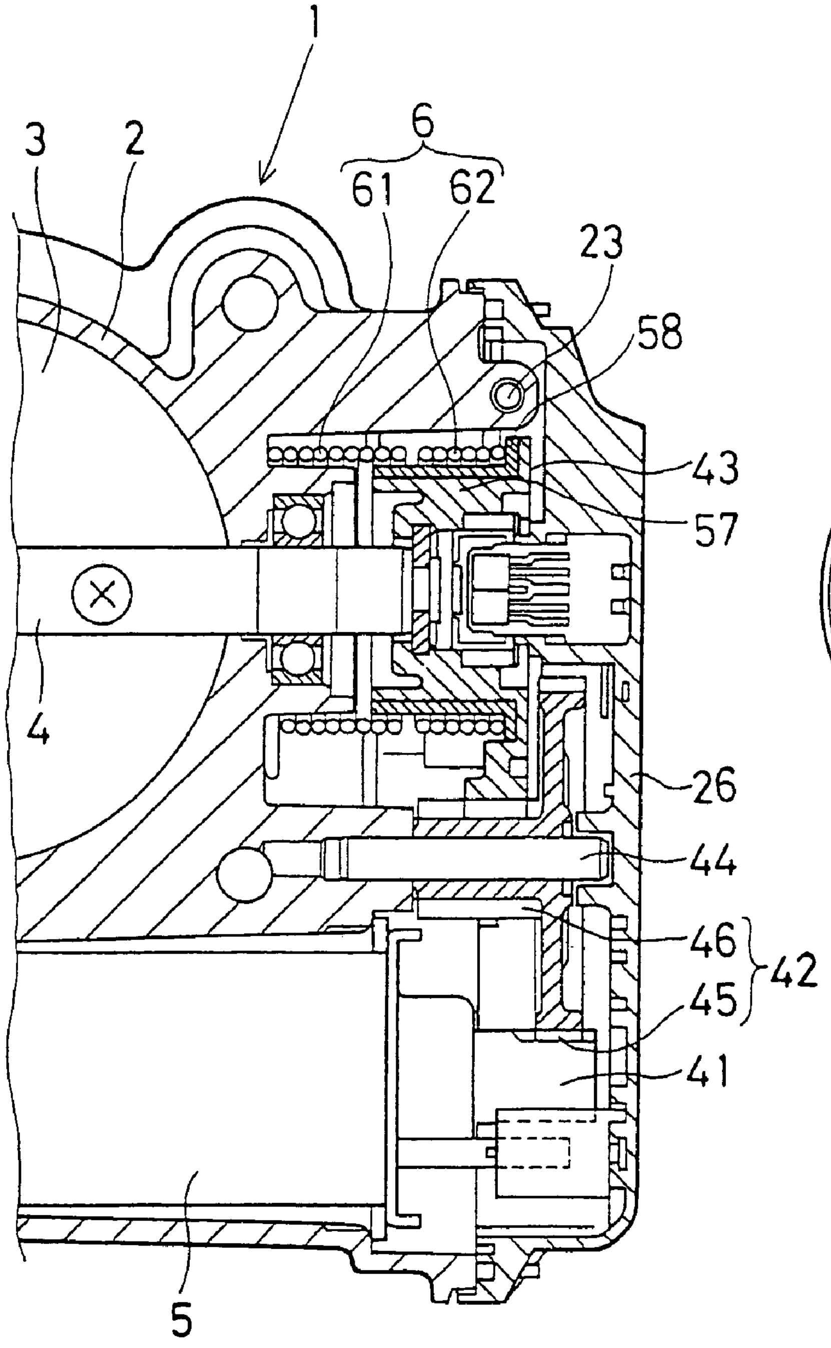
FIG. 7A is a sectional view illustrating the major part of the electronically controlled throttle apparatus according to a fourth embodiment of the present invention.
Figure 7B:
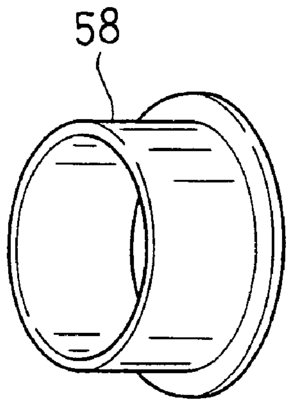
FIG. 7B is a perspective view illustrating a second guide member in the fourth embodiment.

As illustrated in FIG. 1 and FIGS. 3A and 3B, the first spring inside circumferential guide 16 is integrally formed so that the guide 16 is protruded from the outer wall face of the bore wall portion 2 in the throttle housing 1. That is, the guide 16 is so formed that the guide 16 is protruded from the cylindrical, concave bottom wall face of the gear case 19 to the right as viewed in the figures. The first spring inside circumferential guide 16 holds the inside diameter side of the first spring portion 61 of the coil spring 6.

At the lower part, as viewed in the figures, of the gear case 19, a greatly concave motor housing portion (motor case portion) as compared with a gear housing portion (gear case portion) at the upper part as viewed in the figures is formed. In the center of the upper part, as viewed in the figures, of the gear case 19 of the throttle housing 1, a boss-like fully closed position stopper 21 which protrudes inward is formed. In the fully closed position stopper 21, a fully closed position stopper member (adjust screw) 23 is screwed. The fully closed position stopper member 23 has a locking portion against which a fully closed position stopper portion 22 integrally formed on the valve gear 43 is abutted when the throttle valve 3 is closed to the fully closed position.

Further, on the left side, as viewed in the figures, of the gear case 19 of throttle housing 1, a boss-like intermediate position stopper (housing hook or default stopper) 24 which protrudes inward is formed. In the intermediate position stopper 24, an intermediate stop member (adjust screw) 25 having a locking portion is screwed. The locking portion holds or locks the throttle valve 3 in a predetermined position if current supply to the driving motor 5 is interrupted for some reason. At this time, biasing forces different in direction from the first and second spring portions 61 and 62 of the coil spring 6 are utilized. This predetermined position (intermediate stop position) is an intermediate position between the fully closed position and the fully open position. On the inside circumferential portion of the gear case 19 on the opposite side to the intermediate position stopper 24, a boss-like fully open position stopper 29 which protrudes inward is formed. The fully open position stopper 29 is constructed so that when the throttle valve 3 is opened up to the fully open position, a fully open position stopper portion (not shown) integrally formed on the valve gear 43 is abutted against the stopper 29.

Further, on the open side of the gear case 19 of the throttle housing 1, the sensor cover 26 is installed for closing the open side of the gear case 19. The sensor cover 26 is made of thermoplastic resin which electrically insulates one terminal of the above-mentioned throttle position sensor from another. The sensor cover 26 has a fitted portion to be fitted to a fitting portion formed on the open side of the gear case 19 and is assembled onto the open-side end of the gear case 19 with rivets and screws (not shown). In this embodiment, as illustrated in FIGS. 3A and 3B, a first locking portion 27 for locking one end of the first spring portion 61 of the coil spring 6 is integrally formed on the outer wall face of the bore wall portion 2 in the throttle housing 1. That is, the first locking portion 27 is formed on the cylindrical, concave bottom wall face of the gear case 19.

The throttle valve 3 is made of a metal material or resin material and is formed substantially in disk shape. The throttle valve 3 is a butterfly-type rotary valve which controls the quantity of intake air taken into an engine. The throttle valve 3 is inserted into a valve insertion hole (not shown) formed in the shaft 4 and fastened and secured on the shaft 4 with fasteners 28, such as fastening screws. The shaft 4 has a valve holding portion for holding the throttle valve 3 and is formed of a metal material in round bar shape. Both sides of the valve holding portion are rotatably or slidably supported by the second spring inside circumferential guide 16 and the shaft bearing portion 18. At the right end, as viewed in the figures, of the shaft 4, the valve gear 43, one of the components of the mechanical reduction gear, and the rotor 10, one of the components of the throttle position sensor, are installed.

The driving motor 5 is integrally connected with energizing terminals for motor encased in the gear case 19 and the sensor cover 26, and is a driving source which is actuated when power is applied thereto. The driving motor 5 comprises a field comprising a yoke 31 and the like made of ferrous metal material (magnetic material) having a plurality of permanent magnets 30 held on the inside circumferential surface thereof; a bearing case 32 fixed on the right end, as viewed in the figure, of the yoke 31 by such a fixing means as crimping; an armature rotatably supported in the yoke 31 and the bearing case 32; and a brush 33 for supplying the armature with current.

The armature is a rotor (stator) which comprises a shaft 36 whose left end, as viewed in the figure, is rotatably supported in the bearing holding portion of the yoke 31 through a thrust bearing 34 and whose right side, as viewed in the figure, is rotatably supported in the bearing holding portion of the bearing case 32 through a ball bearing 35; an armature core 38 which is secured on the circumferential surface of the shaft 36 and has an armature coil 37 wound around the outside circumferential surface thereon; a commutator 39 electrically connected with the armature coil 37; and the like. Brushes 33 are slidably held in a brush holder fixed in the bearing case 32. Each brush 33 is constantly pressed by the coil spring (not shown) so that the brush 33 will be in sliding contact with the outside circumferential surface of the commutator 39.

The reduction gear is used to reduce the rotational speed of the driving motor 5 so that a predetermined reduction ratio will be obtained. The reduction gear comprises a pinion 41 fixed on the circumferential surface of the shaft 36 of the driving motor 5; an intermediate reduction gear 42 rotated in engagement with the pinion 41; and the valve gear 43 rotated in engagement with the intermediate reduction gear 42. The reduction gear is a valve driving means which rotatably drives the throttle valve 3 and the shaft 4 thereof. The pinion 41 is a motor gear which is integrally formed of metal material in predetermined shape and is rotated integrally with the shaft 36 of the driving motor 5.

The intermediate reduction gear 42 is formed of resin material in predetermined shape by integral molding. It is rotatably fit onto a support shaft 44 which constitutes the center of rotation. Further, the intermediate reduction gear 42 is provided with a larger-diameter gear 45 to be engaged with the pinion 41 and a smaller-diameter gear 46 to be engaged with the valve gear 43. The pinion 41 and the intermediate reduction gear 42 are a torque transmitting means for transmitting the torque of the driving motor 5 to the valve gear 43. One end (right end as viewed in the figure) of the support shaft 44 in the axial direction is fit into a concave portion formed in the inner wall face of the sensor cover 26. The other end (left end as viewed in the figure) is press-fit into a concave portion formed in the outer wall face of the bore wall portion 2 in the throttle housing 1 and secured there.

The valve gear 43 in this embodiment is formed of resin material in predetermined substantially annular shape by integral molding. On the outside circumferential surface of the valve gear 43, a geared portion 51 to be engaged with the smaller-diameter gear 46 of the intermediate reduction gear 42 is integrally formed. On the outside circumferential portion of the valve gear 43, the fully closed position stopper portion 22 is integrally formed. When the throttle valve 3 is fully closed, the fully closed position stopper portion 22 is locked as a locked portion by the fully closed position stopper member 23.

In the electronically controlled throttle apparatus in this embodiment, as illustrated in FIG. 1 and FIGS. 3A and 3B, the one coil spring 6 is installed between the outer wall face (right end face as viewed in the figures) of the bore wall portion 2 in the throttle housing 1 and the left end face, as viewed in the figure, of the valve gear 43. That is, the coil spring 6 is installed between the cylindrical, concave bottom wall face of the gear case 19 and the left end face of the valve gear 43. In the coil spring 6, the joint (midway portion) between the first spring portion 61 having the returning function and the second spring portion 62 having the opening function is bent substantially in the reverse U-shape. Thus, a U-shaped hook portion 63 to be held by the intermediate stop member 25 is formed there. Both the ends of the coil spring 6 are wound in different directions.

Further, on the bore tall portion-side face (left side end face as viewed in the figures) of the valve gear 43, as illustrated in FIG. 1 and FIGS. 3A and 3B, an opener member 52 and a second spring inside circumferential guide 53 are formed by integral molding. The opener member 52 is in round bar shape and rotated integrally with the shaft 4 of the throttle valve 3. The second spring inside circumferential guide 53 is in cylindrical shape and holds the inside diameter side of the second spring portion 62 of the coil spring 6. The opener member 52 and the second spring inside circumferential guide 53 are so formed that they are protruded to the left in the axial direction as viewed in the figures. On the inside diameter side of the second spring inside circumferential guide 53, the rotor 10 made of ferrous metal material (magnetic material) is formed by insert molding.

On the opener member 52, a second locking portion 54 and an engaging portion 55 are formed by integral molding. The second locking portion 54 locks the other end of the second spring portion 62 of the coil spring 6. The engaging portion 55 diseangageably engages with the U-shaped hook portion 63 which is a joint between the first spring portion 61 and the second spring portion 62. In proximity to the engaging portion 55, a plurality of lateral displacement prevention guides 56 are formed by integral molding. These guides 56 arrest the further movement of the U-shaped hook portion 63 of the coil spring 6 in the axial direction (horizontal direction as viewed in the figures).

As illustrated in FIG. 1 and FIGS. 3A and 3B, the second spring inside circumferential guide 53 is disposed on substantially the same axis as the first spring inside circumferential guide 16 which holds the inside diameter side of the first spring portion 61 of the coil spring 6. The second spring inside circumferential guide 53 is disposed so that it has substantially the same outside diameter as the first spring inside circumferential guide 16. Further, the second spring inside circumferential guide 53 is disposed opposite to the first spring inside circumferential guide 16. Thus, the second spring inside circumferential guide 53 holds the inside diameter side portion of the coil spring 6 extending from the first spring portion 61 in proximity to the U-shaped hook portion 63 of the coil spring 6 to the area in proximity to the other end of the second spring portion 62.

The coil spring 6 in this embodiment is one coil spring. In this spring, the first spring portion 61 and the second spring portion 62 are integrated with each other, and one end of the first spring portion 61 and the other end of the second spring portion 62 are wound in different directions. At the joint between the first spring portion 61 and the second spring portion 62, the U-shaped hook portion 63 is formed. If power supply to the driving motor 5 is interrupted for some reason, the U-shaped hook portion 63 is held by the intermediate stop member 25.

The first spring portion 61 is formed by molding a round rod of spring steel in coil shape. The first spring portion 61 is a return spring provided with a returning function. That is, it biases the throttle valve 3 through the opener member 52 in such a direction that the throttle vale 3 is returned from the fully open position to the intermediate stop position. The second spring portion 62 is formed by molding a round rod of spring steel in coil shape. The second spring portion 62 is a default spring provided with an opening function. That is, it biases the throttle valve 3 through the opener member 52 in such a direction that the throttle valve 3 is returned from the fully closed position to the intermediate stop position.

On one end of the first spring portion 61, a spring body-side hook (first locked portion) 64 is formed. The spring body-side hook 64 is locked or held by the first locking portion 27 integrally formed on the outer wall face of the bore wall portion 2 in the throttle housing 1. On the other end of the second spring portion 62, a spring gear-side hook (second locked portion) 65 is formed. The spring gear-side hook 65 is locked or held by the second locking portion 54 of the opener member 52.

In the electronically controlled throttle apparatus in this embodiment, as illustrated in FIGS. 4A to 4D, a lubricant 7 and 8 is applied to or a coating of a lubricant 7 and 8 is provided to a predetermined area. This area is a predetermined part of an area of sliding contact between the inside circumferential surface of the coil spring 6 extending from vicinity of the U-shaped hook portion 63 which is the joint between the first spring portion 61 and the second spring portion 62 of the coil spring 6 to the other end of the second spring portion 62 and the outside circumferential surface of the second spring inside circumferential guide 53 integrally formed on the valve gear 43. The lubricant 7 and 8 is for reducing the sliding resistance in relative motion between the inside circumferential surface of the portion of the coil spring 6 in proximity to the U-shaped hook portion 63 and the second spring portion 62 and the outside circumferential surface of the second spring inside circumferential guide 53.

For the lubricant 7 and 8, it is preferable that the following one or more low-sliding resistance materials should be used: ethylene tetrafluoride resin (PTFE), fluorocarbon resin (FEP, ETFE, PVDF, PCTFE), and polyamide resin. Further, the above predetermined part may be covered with a reinforcing material, such as alamido fibers. Furthermore, any one or more lubricants of oil lubricant, semi-solid lubricant (grease), and solid lubricant may be applied to the above predetermined part.

It is assumed that the throttle valve 3 is opened from the intermediate stop position when the electronically controlled throttle apparatus is normally operating. When the driver depresses the accelerator pedal, an accelerator position signal is inputted from the accelerator position sensor to the ECU. The driving motor 5 is energized by the ECU and the shaft 36 of the driving motor 5 is rotated so that the throttle valve 3 will be brought into a predetermined opening. As a result of rotation of the shaft 36, the pinion 41 is rotated counterclockwise as viewed in FIG. 2, and torque is transmitted to the larger-diameter gear 45 of the intermediate reduction gear 42. With the rotation of the larger-diameter gear 45, the smaller-diameter gear 46 is rotated about the support shaft 44 clockwise as viewed in FIG. 2. As a result, the valve gear 43 having the geared portion 51 in engagement with the smaller-diameter gear 46 is rotated.

At this time, the engaging portion 55 of the opener member 52 presses the U-shaped hook portion 63 formed at the joint between the first spring portion 61 and the second spring portion 62 of the coil spring 6 against biasing force from the first spring portion 61 having the returning function. As the valve gear 43 is rotated in the open direction at this time, the spring body-side hook 64 produces biasing force. This biasing force is produced at the first spring portion 61 locked or held by the first locking portion 27 integrally formed on the outer wall face of the bore wall portion 2 in the throttle housing 1. The biasing force biases the throttle valve 3 through the opener member 52 in such a direction that the throttle valve 3 is returned from the fully open position to the intermediate stop position.

Figure 2:
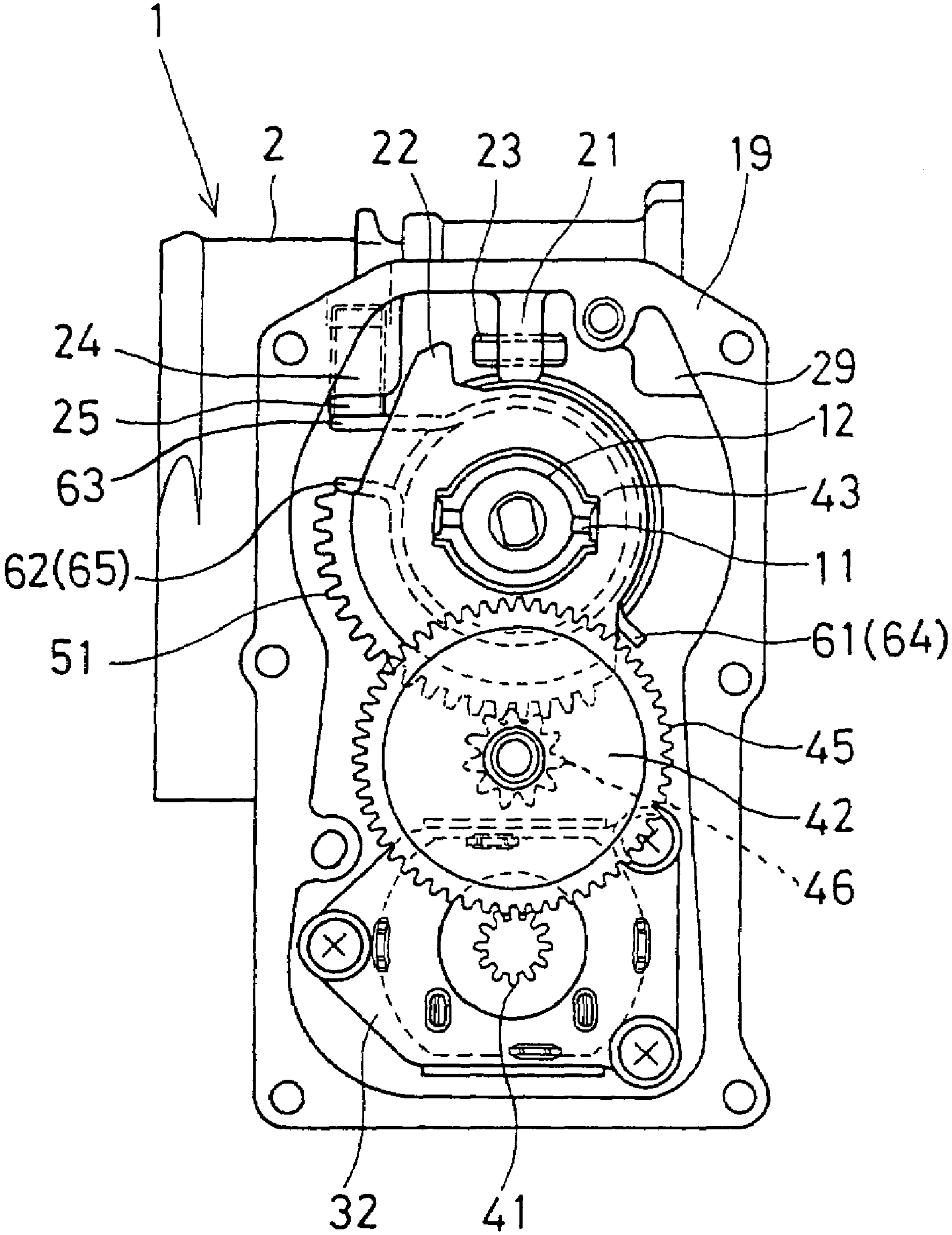
FIG. 2 is a side view illustrating a gear case in a throttle housing, a fitting flange of a driving motor, and a mechanical reduction gear in the first embodiment.

As a result, the valve gear 43 is rotated about the shaft 4 counterclockwise as viewed in FIG. 2. Therefore, the shaft 4 is rotated by a predetermined rotational angle, and the throttle valve 3 is rotationally driven in such a direction that the throttle valve 3 is opened from the intermediate stop position to the fully open position (open direction). Biasing force from the second spring portion 62 having the opening function does not involve this rotation of the throttle valve 3 in the open direction. The opener member 52 is kept in a state in which the opener member 52 is sandwiched between the joint-side end of the second spring portion 62 and the spring gear-side hook 65.

It is assumed next that the throttle valve 3 is conversely closed from the intermediate stop position when the electronically controlled throttle apparatus is normally operating. When the driver releases the accelerator pedal, the throttle valve 3, the shaft 4 thereof, and the valve gear 43 are rotated in the reverse direction by the reverse rotation of the driving motor 5.

At this time, the second locking portion 54 of the opener member 52 presses spring gear-side hook 65 of the second spring portion 62 against biasing force from the second spring portion 62 having the opening function. As the valve gear 43 is rotated in the closing direction at this time, the spring gear-side hook 65 produces biasing force. This biasing force is produced at the second spring portion 62 locked or held by the second locking portion 54 of the opener member 52. The biasing force energizes the throttle valve 3 through the opener member 52 in such a direction that the throttle valve 3 is returned from the fully closed position to the intermediate stop position.

As a result, the valve gear 43 is rotated about the shaft 4 clockwise as viewed in FIG. 2. Therefore, the shaft 4 is rotated by a predetermined rotational angle, and the throttle valve 3 is rotationally driven in such a direction that the throttle valve 3 is closed from the intermediate stop position to the fully closed position. That is, the throttle valve 3 is rotationally driven in the closing direction which is opposite to the open direction of the throttle valve 3. As a result, the fully closed position stopper portion 22 formed on the outside circumferential portion of the valve gear 43 by integral molding is abutted against the fully closed position stopper member 23. Thereby, the throttle valve 3 is held in the fully closed position. Biasing force from the first spring portion 61 having the returning function does not involve this rotation of the throttle valve 3 in the closing direction. The direction of current passed through the driving motor 5 is reversed with the intermediate stop position taken as the border.

The electronically controlled throttle apparatus operates as follows, if current supply to the driving motor 5 is interrupted for some reason. At this time, with the opener member 52 sandwiched between the joint-side end of the second spring portion 62 and the spring gear-side hook 65, the engaging portion 55 of the opener member 52 is abutted against the U-shaped hook portion 63 of the coil spring 6. This is done by biasing force from the returning function of the first spring portion 61. This biasing force biases the throttle valve 3 through the opener member 52 in such a direction that the throttle valve 3 is returned from the fully open position to the intermediate stop position.

Biasing force from the opening function of the second spring portion 62 also involves the above abutting action. This biasing force energizes the throttle valve 3 through the opener member 52 in such a direction that the throttle valve 3 is returned from the fully closed position to the intermediate stop position. Thus, the throttle valve 3 is held in the intermediate stop position without fail. Therefore, if current supply to the driving motor 5 is interrupted for some reason, the vehicle can be driven to a turnout.

The electronically controlled throttle apparatus in this embodiment adopts a coil spring structure. This spring structure is intended to reduce the number of parts in an opener mechanism for the simplification of construction and to enhance the accuracy of the opening angle of the throttle valve 3 in the intermediate stop position. In this structure, the joint between the first spring portion 61 having the returning function and the second spring portion 62 having the opening function is bent substantially in the reverse U-shape. Thus, the U-shaped hook portion 63 which is fixed by the intermediate position stopper 24 (intermediate stop member 25) fixed on the throttle housing 1 is formed. The ends of the coil spring are wound in different directions.

When the throttle valve 3 is opened from the intermediate stop position, the following operation takes place. As illustrated in FIGS. 3A and 3B, the spring body-side hook 64 on the side of the bore wall portion 2 in the throttle housing (throttle body) 1 is locked or held by the first locking portion 27 of the bore wall portion 2 in the throttle housing 1. The U-shaped hook portion 63 of the coil spring 6 is rotated together with the spring gear-side hook 65. Thus, the first spring portion 61 produces biasing force which energizes the throttle valve 3 through the opener member 52 in such a direction that the throttle valve 3 is returned from the fully open position to the intermediate stop position.

At this time, the first spring inside circumferential guide 16 integrally formed on the bore wall portion 2 in the throttle housing 1 which guide 16 presses the inside diameter portion of the first spring portion 61 of the coil spring 6 does not make large relative motion relative to the inside circumferential surface of the first spring portion 61 of the coil spring 6. At this time, the U-shaped hook portion 63 of the coil spring 6, the engaging portion 55 of the opener member 52 and a plurality of lateral displacement prevention guides 56 formed integrally with the valve gear 43 move integrally with one another. Therefore, relative motion does not occur between the U-shaped hook portion 63 and the opener member 52.

When the throttle valve 3 is closed from the intermediate stop position, the following operation takes place. As illustrated in FIGS. 3A and 3B, the U-shaped hook portion 63 of the coil spring 6 is fixed by the locking portion of the intermediate stop member (housing hook) 25 fixed in the throttle housing 1. The opener member 52 is rotated together with the spring gear-side hook 65. Thus, the second spring portion 62 produces biasing force which energizes the throttle valve 3 through the opener member 52 in such a direction that the throttle valve 3 is returned from the fully closed position to the intermediate stop position.

At this time, the second spring inside circumferential guide 53 which is integrally formed on the valve gear 43 which presses the inside diameter portion of the second spring portion 62 of the coil spring 6 makes large relative motion relative to the inside circumferential surface of the second spring portion 62 of the coil spring 6. At this time, relative motion also takes place between the U-shaped hook portion 63 of the coil spring 6 and the engaging portion 55 of the opener member 52 integrally formed on the valve gear 43. Further, relative motion also takes place between the U-shaped hook portion 63 and a plurality of lateral displacement prevention guides 56. As a result, sliding resistance is increased.

Therefore, when the throttle valve 3 is closed from the intermediate stop position, relative motion takes place between the outside circumferential surface of the second spring inside circumferential guide 53 integrally formed on the valve gear 43 and the inside circumferential surface of the second spring portion 62 of the coil spring 6. Thus, throttle valve may become in operative due to great sliding resistance in the relative motion.

To cope with this, in the electronically controlled throttle apparatus in this embodiment, a lubricant 7 and 8 is applied to or a coating of a lubricant 7 and 8 is provided to a predetermined area. As illustrated in FIGS. 4A to 4D, this area is a predetermined part of an area of sliding contact between the inside circumferential surface of the coil spring 6 extending from the vicinity of the U-shaped hook portion 63 of the coil spring 6 to the other end of the second spring portion 62 and the outside circumferential surface of the second spring inside circumferential guide 53 integrally formed on the valve gear 43.

The lubricant 7 and 8 is for reducing the sliding resistance in relative motion between the inside circumferential surface of the coil spring 6 and the outside circumferential surface of the second spring inside circumferential guide 53. Thus, sliding resistance in relative motion between the outside circumferential surface of the second spring inside circumferential guide 53 and the inside circumferential surface of the coil spring 6 can be significantly reduced.

A lubricant may be applied to a predetermined part of an area of sliding contact between the inside circumferential surface of the coil spring 6 in proximity to the U-shaped hook portion 63 and the outside circumferential surface of the second spring inside circumferential guide 53. This lubricant is for reducing the sliding resistance in relative motion between the U-shaped hook portion 63 of the coil spring 6 and the outside circumferential surface of the second spring inside circumferential guide 53. Further, a lubricant may be applied to a predetermine part of an area of sliding contact between the U-shaped hook portion 63 and the engaging portion 55 of the opener member 52. This lubricant is for reducing the sliding resistance in relative motion between the U-shaped hook portion 63 and the engaging portion 55.

Furthermore, a lubricant may be applied to a predetermined part of an area of sliding contact between the U-shaped hook portion 63 and the lateral displacement prevention guides 56 of the opener member 52. This lubricant is for reducing the sliding resistance in relative motion between the U-shaped hook portion 63 and the lateral displacement prevention guides 56. Thus, the throttle valve 3, the shaft 4, and the valve gear 43 can be smoothly operated.

As a result, the following effects are produced: the number of parts can be reduced to simplify the construction, and further the accuracy of the opening angle of the throttle valve 3 in the intermediate stop position can be enhanced. In addition, the inoperativeness of the throttle valve 3, the shaft 4, or the valve gear 43 which may occur when the throttle valve 3 is closed from the intermediate stop position can be significantly reduced. Further, the durability of the coil spring 6 and the second spring inside circumferential guide 53 on the side of the valve gear 43 can be significantly enhanced.

[Second Embodiment]

In the second embodiment, one coil spring 6 is installed on the valve gear 43 on the side opposite the throttle valve 3. In the coil spring 6, the joint (midway portion) between the first spring portion 61 having the returning function and the second spring portion 62 having the opening function is bent substantially in the reverse U-shape. Thus, a U-shaped hook portion 63 to be held by the intermediate stop member 25 is formed there. Both ends of the coil spring 6 are wound in different directions.

The spring body-side hook (first locked portion) 64 of the first spring portion 61 is locked or held by the first locking portion 71 integrally formed on the throttle housing 1. The spring gear-side hook (second locked portion) 65 of the second spring portion 62 is locked or held by the second locking portion 72 of the opener member 52 of the valve gear 43.

The first spring inside circumferential guide 73 on the throttle housing 1 side holds the inside diameter side of the first spring portion 61 of the coil spring 6. The second spring inside circumferential guide 74 on the valve gear 43 side holds the inside diameter side of the coil spring 6 extending from the first spring portion 61 in proximity to the U-shaped hook portion 63 of the coil spring 6 to the vicinity of the other end of the second spring portion 62.

In the electronically controlled throttle apparatus in the second embodiment as well, the same effects as in the first embodiment can be produced by taking appropriate measures. Such measures include a coating of a low-sliding resistance member provided to a predetermined area. This predetermined area is a predetermine part of an area of sliding contact between the inside circumferential surface of the coil spring 6 in proximity to the U-shaped hook portion 63 and the second spring portion 62 and the outside circumferential surface of the second spring inside circumferential guide 74 integrally formed on the valve gear 43. This low-sliding resistance member (e.g. PTFE, such lubricant as grease) is for reducing the sliding resistance in relative motion between the inside circumferential surface of the coil spring 6 and the outside circumferential surface of the second spring inside circumferential guide 74. Alternatively, the predetermined part may be covered with a reinforcing material, such as alamido fibers. The predetermined part may be integrally formed of a low-sliding resistance material.

As in the first embodiment, a lubricant may be applied to a predetermined part of an area of sliding contact between the inside circumferential surface of the coil spring 6 in proximity to the U-shaped hook portion 63 and the outside circumferential surface of the second spring inside circumferential guide 74. This lubricant is for reducing the sliding resistance in relative motion between the inside circumferential surface of the U-shaped hook portion 63 of the coil spring 6 and the outside circumferential surface of the second spring inside circumferential guide 74.

Further, a lubricant may be applied to a predetermined part of an area of sliding contact between the U-shaped hook portion 63 and the engaging portion 55 of the opener member 52. This lubricant is for reducing the sliding resistance in relative motion between the U-shaped hook portion 63 and the engaging portion 55 of the opener member 52. Furthermore, a lubricant may be applied to a predetermined part of an area of sliding contact between the U-shaped hook portion 63 and the lateral displacement prevention guides 56 of the opener member 52. This lubricant is for reducing the sliding resistance in relative motion between the U-shaped hook portion 63 and the lateral displacement prevention guides 56.

[Third Embodiment]

On the bore wall portion-side face (left side end face as viewed in the figure) of the valve gear 43 in this embodiment, the opener member 52 and the second spring inside circumferential guide are formed by integral molding. The opener member 52 is in round bar shape and rotated integrally with the shaft 4 of the throttle valve 3. The second spring inside circumferential guide is in cylindrical shape and holds the inside diameter side of the second spring portion 62 of the coil spring 6. The opener member 52 and the second spring inside circumferential guide are so formed that they are protruded to the left as viewed in the figure. In general, the valve gear 43 made of metal material with the rotor 10 formed by insert molding is formed in predetermined shape by integral molding. To ensure the strength, the valve gear 43 is formed of heat-resistant resin, such as poly (phenylene sulfide) (PPS), or heat-resistant reinforced resin, such as poly (butylene terephthalate) (PBT), reinforced with glass fibers.

The second spring inside circumferential guide in this embodiment comprises a first guide member 57, cylindrical in shape, which is protruded from the bore wall portion-side face (left side end face as viewed in the figure) of the valve gear 43 to the other end (to the left as viewed in the figure) in the axial direction and further has the rotor 10 formed by insert molding on the inside circumferential portion thereof; a second guide member 58, cylindrical in shape, which covers the entire outside circumferential portion of the first guide member 57; and the like.

The second guide member 58 is integrally formed of a material which allows reduction in sliding resistance in relative motion between the inside circumferential surface of the coil spring 6 and the outside circumferential surface of the second guide member 58. The materials usable for the second guide member 58 include non-reinforced resins which are not reinforced with glass fibers, resin materials having a lubricating function mixed with ethylene tetrafluoride resin (PTFE) or fluorocarbon resin (FEP, ETFE, PVDF, PCTFE), and resin materials such as phenolic resin (PF).

The first guide member 57 formed on the valve gear 43 by integral molding is molded from the same heat-resistant reinforced resin reinforced with glass fibers as for the valve gear 43. Therefore, glass fibers are contained in the outside circumferential portion (surface layer) of the first guide member 57. As a result, when the outside circumferential surface of the first guide member 57 and the inside circumferential surface of the coil spring 6 are brought into direct sliding contact with each other, a problem may arise. The sliding resistance in relative motion between the outside circumferential surface of the first guide member 57 and the inside circumferential surface of the coil spring 6 is increased.

To cope with this, the second guide member 58 formed of heat-resistant reinforced resin is formed on the outside circumferential surface of the first guide member 57 by integral molding. Thus, the sliding resistance in relative motion between the outside circumferential surface of the second spring inside circumferential guide 53 and the inside circumferential surface of the coil spring 6 can be significantly reduced. As a result, the same effects as in the first embodiment can be produced.

[Fourth Embodiment]

In this embodiment, the second guide member 58, cylindrical in shape, which is molded separately from the valve gear 43 is fit onto the outside circumferential surface of the first guide member 57, cylindrical in shape, formed on the left side end face, as viewed in the figures, of the valve gear 43 by integral molding. Thus, the shape of the valve gear 43 can be simplified, and the structure of the second guide member can be implemented with ease. As a result, productivity can be enhanced.

[Fifth Embodiment]

Figure 8B:
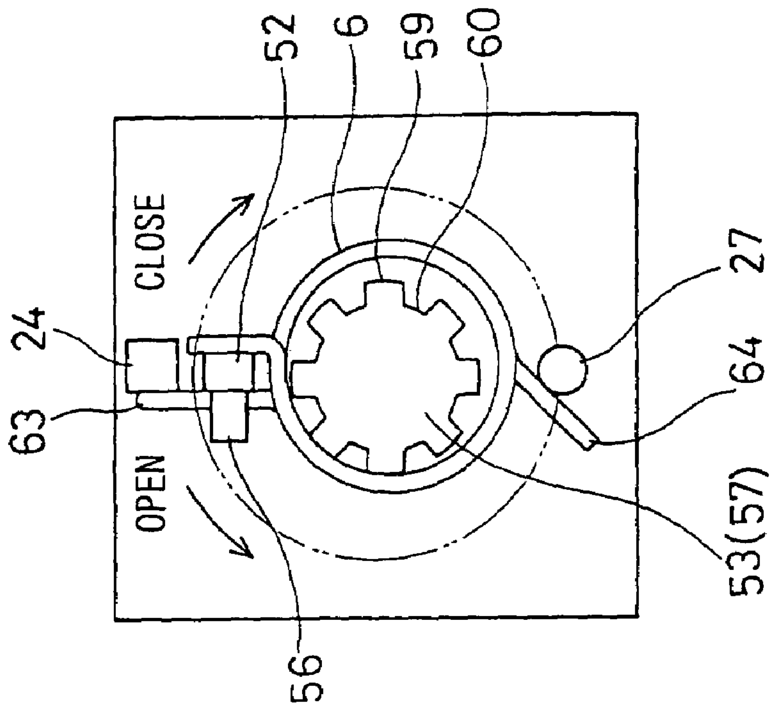
FIGS. 8A and 8B are schematic views illustrating a major part of an electronically controlled throttle apparatus according to a fifth embodiment of the present invention.
Figure 8A:
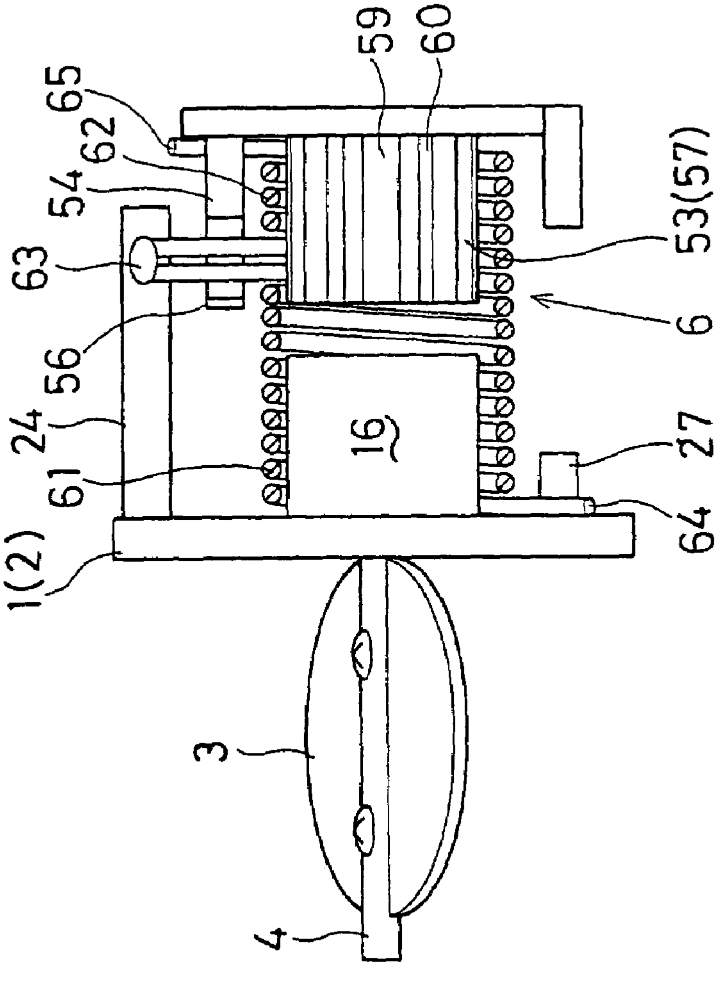

As shown in FIGS. 8A and 8B, the second spring inside circumferential guide (guide member) 53 is formed on the bore wall portion-side face (left side end face as viewed in the figures) of the valve gear 43 by integral molding so that the guide 53 is protruded to the left as viewed in the figures in the axial direction. In this embodiment, on the outside circumferential portion of the second spring inside circumferential guide (guide member) 53, projected portions 59 and recessed portions 60 are integrally formed. The projected portions 59 and recessed portions 60 alternate at equal intervals in the circumferential direction (like a gear wheel).

Thus, the area of contact between the outside circumferential surface of the second spring inside circumferential guide 53 and the inside circumferential surface of the second spring portion 62 of the coil spring 6 is reduced. Also, the area of contact between the outside circumferential surface of the second spring inside circumferential guide 53 and the inside circumferential surface of the coil spring 6 in proximity to the U-shaped hook portion 63 is reduced. Therefore, the sliding resistance in relative motion between the inside circumferential surface of the coil spring 6 and the outside circumferential surface of the second spring inside circumferential guide 53 can be significantly reduced. As a result, the same effects as in the first embodiment can be produced.

The fifth embodiment is advantageous in that not only the sliding resistance between the coil spring 6 and the guide member 53 is reduced by the recessed portions 60 but also wear powders produced by the sliding contact between the coil spring 6 and the guide member 53 are discharged through the recessed portions 60.

[Other Embodiments]

In the third to the fifth embodiments, it is preferred to apply a lubricant at an area of sliding contact between the coil spring 6 and the guide member 58.

In the above embodiments, a lubricant 7 and 8 or a low-sliding resistance member is applied to or a coating thereof is given to a predetermined part of an area of sliding contact between the inside circumferential surface of the second spring portion 62 of the coil spring 6 and the outside circumferential surface of the second spring inside circumferential guide 53 or 74 integrally formed on the valve gear 43. This lubricant or member is for reducing the sliding resistance in relative motion between the inside circumferential surface of the coil spring 6 and the outside circumferential surface of the second spring inside circumferential guide 53 or 74.

Alternatively, a lubricant may be applied to the entire coil spring 6 (for example, both the inside diameter portion and the outside diameter portion thereof). This lubricant is for reducing the sliding resistance in relative motion between the inside circumferential surface of the coil spring 6 and the outside circumferential surface of the second spring inside circumferential guide 53 or 74.

For lubricant, a coating, grease, or the like of ethylene tetrafluoride resin (PTFE) is easy to handle and is favorable. Alternatively, a thin film material impregnated with the lubricant may be placed at the above predetermined part. The coil spring 6 or the second spring inside circumferential guide 53 or 74 itself may be formed of a low-sliding resistance material (PTFE, reinforcing material such as alamido fiber). This material is for reducing the sliding resistance in relative motion between the inside circumferential surface of the coil spring 6 and the outside circumferential surface of the second spring inside circumferential guide 53 or 74.

In the above embodiments, a Hall element 13 is used as a non-contact detecting element. Alternatively, a Hall IC, a magnetic resistance element, or the like may be used as a non-contact detecting element. In the above embodiments, split permanent magnets 11 are used as a source of magnetic fields. Alternatively, a cylindrical permanent magnet may be used as a source of magnetic fields.

Other variations and modifications are also possible without departing from the spirit of the invention.

What is claimed is:

1. An electronically controlled throttle apparatus comprising:

a throttle valve supported by a throttle shaft for opening and closing an intake air passage formed in a throttle housing:

a valve gear which is integrally provided with an opener member which is rotatably driven by an actuator thereby to open and close the throttle valve; and a coil spring having a first coil spring portion and a second coil spring portion integrated with each other, the first coil spring portion biasing the throttle valve through the opener member in such a direction that the throttle valve is returned from a fully open position to an intermediate position, and the second coil spring portion being wound in an opposite direction relative to the first spring portion and biasing the throttle valve through the opener member in such a direction that the throttle valve is returned from a fully closed position to the intermediate position, wherein the valve gear is integrally provided with a guide member, which holds an inside diameter side of a portion of the coil spring extending at least from a joint between the first spring portion and the second spring portion to an end of the second spring portion; and wherein a lubricant is provided at a predetermined part of an area of slidable contact between an inside circumferential surface of the second spring portion and an outside circumferential surface of the guide member or to a predetermined part of an area of slidable contact between the inside circumferential surface in proximity to the joint between the first spring portion and the second spring portion and the outside circumferential surface of the guide member for reducing sliding resistance in relative motion between the inside circumferential surface of the coil spring and the outside circumferential surface of the guide member.

2. An electronically controlled throttle controller as in claim 1 wherein the lubricant includes any one of the group consisting of: oil lubricant, semi-solid lubricant and solid lubricant, and applied to the predetermined part.

3. An electronically controlled throttle controller as in claim 1 wherein the lubricant includes any one of the group consisting of: ethylene tetrafluoride resin, fluorocarbon resin and polyamide resin, and coated on the predetermined part.

4. An electronically controlled throttle apparatus comprising:

a throttle valve supported by a throttle shaft for opening and closing an intake air passage formed in a throttle housing;

a valve gear which is integrally provided with an opener member which is rotatably driven by an actuator to thereby open and close the throttle valve; and a coil spring having a first coil spring portion and a second coil spring portion integrated with each other, the first coil spring portion biasing the throttle valve through the opener member in such a direction that the throttle valve is returned from a fully open position to an intermediate position, and the second coil spring portion being wound in an opposite direction relative to the first spring portion and biasing the throttle valve through the opener member in such a direction that the throttle valve is returned from a fully closed position to the intermediate position, wherein the throttle housing includes an intermediate stopper member for holding the throttle valve in the intermediate position, wherein a joint between the first spring portion and the second spring portion is a U-shaped hook portion bent substantially in reverse U shape which is held by the intermediate stopper member when power supply to the actuator is interrupted, wherein the opener member includes an engaging portion, which disengageably engages with the U-shaped hook portion, and a lateral displacement prevention guide, which is located in proximity to the engaging portion for arresting movement of the U-shaped hook portion in an axial direction, and wherein a lubricant is provided at a predetermined part of an area of slidable contact between the U-shaped hook portion and the engaging portion for reducing sliding resistance in relative motion between the U-shaped hook portion and the engaging portion, or at a predetermined part of an area of slidable contact between the U-shaped hook portion and the lateral displacement prevention guide for reducing sliding resistance in relative motion between the U-shaped hook portion and the lateral displacement prevention guide.

5. An electronically controlled throttle controller as in claim 4 wherein the lubricant includes any one of the group consisting of: oil lubricant, semi-solid lubricant and solid lubricant, and applied to the predetermined part.

6. An electronically controlled throttle controller as in claim 4 wherein the lubricant includes any one of the group consisting of: ethylene tetrafluoride resin, fluorocarbon resin and polyamide resin, and coated on the predetermined part.

* * * * *